W. Courtney.
Bee-Hive.
N° 72808. Patented Dec. 31, 1867.
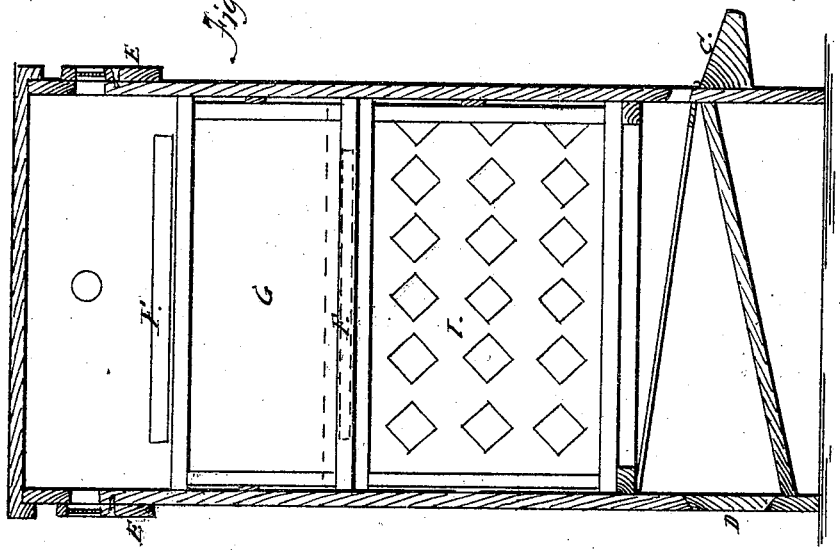
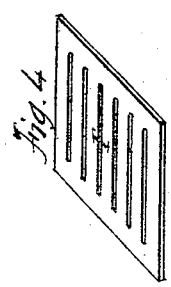
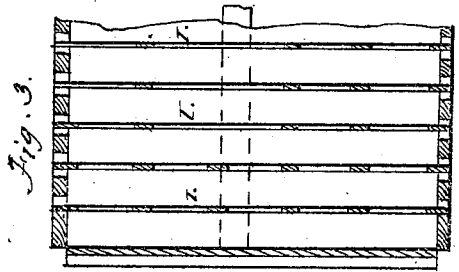
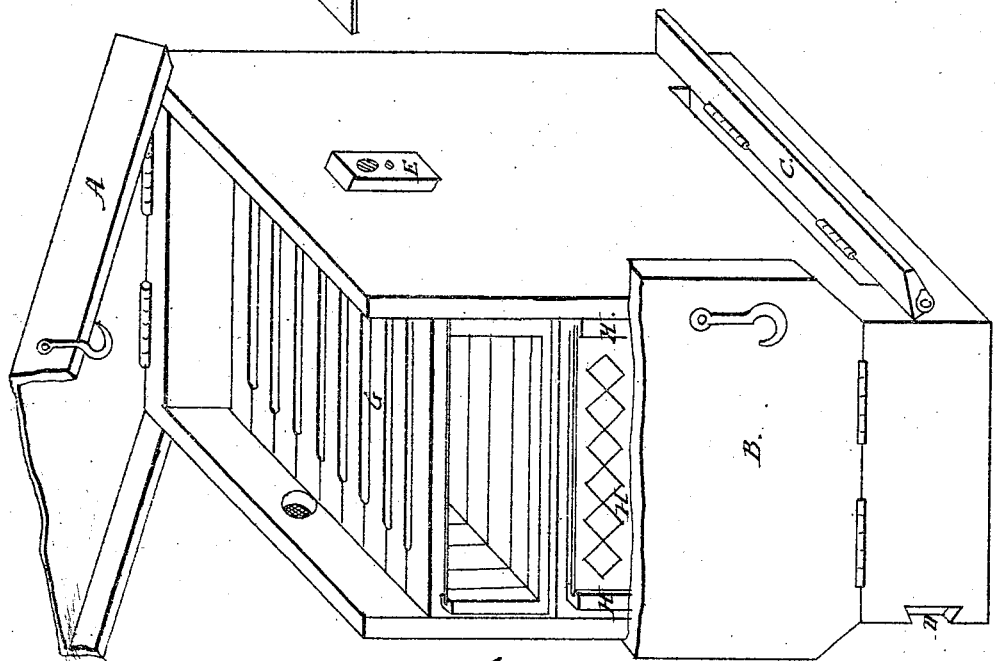
Witnesses: J. H. Sprague, Chas. F. Clausen
Wm Courtney, Inventor
D. P. Holloway & Co., his Attys

United States Patent Office.

WILLIAM COURTNEY, OF RICHVIEW, ILLINOIS.

Letters Patent No. 72,808, dated December 31, 1867.

---

IMPROVEMENT IN BEE-HIVES.

---

The Schedule referred to in these Letters Patent and making part of the same.

---

TO ALL WHOM IT MAY CONCERN:

Be it known that I, WILLIAM COURTNEY, of Richview, in the county of Washington, and State of Illinois, have invented a new and useful Improvement in Bee-Hives; and I do hereby declare that the following is a full, clear, and exact description of the same, reference being had to the annexed drawings making part of this specification, in which—

Figure 1 is a perspective view,

Figure 2 a vertical longitudinal section, and

Figure 3 is a vertical section of the honey-box.

Figure 4 is a perspective view of the board for regulating the circulation.

The same letters in all the figures indicate the same parts.

My invention relates to the arrangement of a bee-hive, so as more perfectly to secure the requisite circulation and equal distribution of heat, together with the requisite facilities for regulating the work of the bees.

The following description will enable persons skilled in the art to construct my improved bee-hive.

In the annexed drawings, A is a hinged top, which may be opened when it is desired to give free access to the interior of the hive, as may also one of the sides B, which is attached by hinges, so that it may be folded down, thus affording every requisite facility for reaching the interior parts of the hive. C is an adjustable alighting-board, attached by hinges to the front of the hive in such manner that it may be folded up to completely cover the aperture through which the bees enter and leave the hive. D is a slide in the back of the hive, for the purpose of regulating the circulation through the hive. E E E E are four buttons, pivoted in the middle, and having a hole through one end, covered by a wire gauze. There is a corresponding hole under each of the buttons, so arranged that by turning the solid end of the buttons up, said apertures may be entirely closed, or by reversing the position of the buttons, the holes may be opened for purposes of ventilation, but secured against the escape of the bees from the hive, or, by turning the buttons horizontally, the holes may be completely opened, so that the bees may pass through. F is a perforated cover for the surplus-honey box, or main hive. It is of less area than the interior of the hive, and may be slid enough from side to side to close or open the spaces between the frames; so that the amount of circulation may be regulated according to circumstances. When it is desired to remove the surplus-honey box, the board F may be passed between them to cut off all communication. G is the surplus-honey box, which is composed of eight rectangular frames, arranged side by side, the outer ones being covered by plates of glass to close the ends. The frames are joined by strips, placed across their ends, and screwed thereon, so as to form one entire box, with openings only above and below for the passage of the bees upwards and downwards. One of the frames may be removed by detaching the screws, and slipping out the frame. The main hive is in like manner composed of eight frames, also arranged as those of the surplus-honey box, and in like manner closed at the ends by plates of glass. These frames are in like manner united by strips screwed to the ends, so as to form an entire box, also open above and below for the passage of the bees. The frames in the main hive should be, and those of the honey-box may be, separated by perforated tin plates, I, for the purpose of compelling the bees to build the comb straight, which is very important in the main hive, and desirable in the honey-box. These plates, being perforated, allow a free circulation and a uniformity of heat throughout the hive. These plates are called perforated comb-dividers. When it is desired that the bees shall pass freely throughout the hive, the main hive H and honey-box G are so placed in relation to one another that the spaces between the boxes shall correspond. In order to cut off communication, it is only necessary to move the honey-box until the frames cover the spaces between the frames of the main hive. When it is desired that the working-bees only shall enter the honey-box, excluding the queen bee, so that pure comb, free from brood-comb, may be formed, this may be accomplished by so placing the honey-box that spaces of five thirty-seconds of an inch in width may be left open. The working-bees can pass through these apertures, but the queen bee cannot. The box may be tightly closed for purposes of transportation, with the swarm in the hive.

What I claim as my invention, and desire to secure by Letters Patent, is—

1. In combination with the frames forming the main hive H, as described, the perforated comb-dividers I, constructed and arranged substantially as set forth.

2. The combination of the main hive H and surplus-honey box G, when respectively constructed and arranged within the external case to operate in conjunction, substantially as set forth.

3. The combination of the main hive H, surplus-honey box G, and perforated cover F, arranged in relation to one another and the external case, substantially as and for the purpose set forth.

4. A bee-hive, constructed with the parts A, B, C, D, E, F, G, and H, arranged substantially as set forth.

In testimony whereof, I have signed my name to this specification in the presence of two subscribing witnesses.

WILLIAM COURTNEY.

Witnesses:
    JOS. H. McGUIRE,
    JAMES D. MONDY.